United States Patent
Tamaskar et al.

(10) Patent No.: US 11,492,992 B2
(45) Date of Patent: Nov. 8, 2022

(54) TECHNIQUES FOR TRANSIENT ESTIMATION AND COMPENSATION OF CONTROL PARAMETERS FOR DEDICATED EGR ENGINES

(71) Applicant: Cummins Inc., Columbus, IN (US)

(72) Inventors: Shashank Tamaskar, West Lafayette, IN (US); Kartavya Neema, Columbus, IN (US); Carlos Alcides Lana, Columbus, IN (US); Govindarajan Kothandaraman, Columbus, IN (US)

(73) Assignee: Cummins Inc., Columbus, IN (US)

( * ) Notice: Subject to any disclaimer, the term of this patent is extended or adjusted under 35 U.S.C. 154(b) by 82 days.

(21) Appl. No.: 16/740,592

(22) Filed: Jan. 13, 2020

(65) Prior Publication Data

US 2020/0149491 A1      May 14, 2020

Related U.S. Application Data

(63) Continuation of application No. PCT/US2017/042755, filed on Jul. 19, 2017.

(51) Int. Cl.
  *F02P 5/00*       (2006.01)
  *F02D 41/14*      (2006.01)
  (Continued)

(52) U.S. Cl.
  CPC ..... *F02D 41/1453* (2013.01); *F02D 13/0276* (2013.01); *F02D 41/005* (2013.01);
  (Continued)

(58) Field of Classification Search
  CPC .... F02D 41/006; F02D 13/0219; F02D 37/02; F02D 41/005; F02D 41/0007;
  (Continued)

(56) References Cited

U.S. PATENT DOCUMENTS 7,281,531 B1 * 10/2007 Fulton ................ F02M 26/01
                                              123/568.17
9,032,940 B2   5/2015 Dane et al.
                  (Continued)

FOREIGN PATENT DOCUMENTS

CN          101737180          6/2010
CN          101965447          2/2011
                  (Continued)

OTHER PUBLICATIONS

Search Report and Written Opinion PCT Appln. No. PCT/U17/042755, 11 pgs. dated Sep. 27, 2017.

*Primary Examiner* — John Kwon
(74) *Attorney, Agent, or Firm* — Taft, Stettinius & Hollister LLP

(57) ABSTRACT

One embodiment is a system comprising an engine including a dedicated EGR cylinder configured to provide EGR to the engine via an EGR loop, a non-dedicated cylinder, a plurality of injectors, an ignition system including a plurality of spark plugs, an intake throttle, and an electronic control system. The electronic control system is configured to control combustion during transient operation of the engine by determining one or more combustion control parameters compensating for variation of one or more of inert matter, unburned air and unburned fuel in EGR output by the dedicated EGR cylinder during transient operation of the engine, and an effect of the EGR loop on inert matter, unburned air and unburned fuel provided to the plurality of cylinders, and controlling operation of at least one of the throttle, the ignition system and the plurality of injectors in response to at least one of the one or more combustion control parameters.

27 Claims, 9 Drawing Sheets

(51) Int. Cl.
*F02D 13/02* (2006.01)
*F02D 41/00* (2006.01)
*F02D 41/10* (2006.01)
*F02P 5/15* (2006.01)

(52) U.S. Cl.
CPC ..... *F02D 41/0062* (2013.01); *F02D 41/0072* (2013.01); *F02D 41/0082* (2013.01); *F02D 41/0085* (2013.01); *F02D 41/107* (2013.01); *F02D 41/1443* (2013.01); *F02D 41/1454* (2013.01); *F02P 5/1504* (2013.01)

(58) Field of Classification Search
CPC ............. F02D 41/307; F02D 2041/001; F02D 41/0017; F02M 26/43; F02M 26/02
See application file for complete search history.

(56) References Cited

U.S. PATENT DOCUMENTS

| | | |
|---|---|---|
| 9,074,543 B2 | 7/2015 | Chamarthi et al. |
| 9,109,522 B2 | 8/2015 | Bresch-Pietri et al. |
| 9,008,951 B2 | 9/2015 | Ide et al. |
| 9,243,536 B2 | 1/2016 | Carlsson |
| 9,845,754 B2 | 12/2017 | Lana |
| 10,041,448 B2 | 8/2018 | Glugla |
| 10,174,691 B2 | 1/2019 | Lana et al. |
| 2008/0110161 A1 | 5/2008 | Persson |
| 2008/0167791 A1* | 7/2008 | Fulton ................... F02M 26/47 60/299 |
| 2011/0313634 A1 | 12/2011 | Yasui et al. |
| 2014/0142833 A1 | 5/2014 | Gingrich et al. |
| 2014/0196702 A1 | 7/2014 | Gingrich et al. |
| 2014/0223903 A1 | 8/2014 | Keating |
| 2014/0360461 A1 | 12/2014 | Ulrey |
| 2015/0114341 A1 | 4/2015 | Geokier et al. |
| 2015/0121851 A1 | 5/2015 | Dane et al. |
| 2015/0176513 A1* | 6/2015 | Lana ..................... F02P 5/1516 123/698 |
| 2015/0219028 A1 | 8/2015 | Gingrich et al. |
| 2015/0354477 A1 | 12/2015 | Leone et al. |
| 2016/0102636 A1 | 4/2016 | Styles et al. |
| 2016/0187592 A1 | 6/2016 | Woodward |
| 2017/0218863 A1* | 8/2017 | Geckler ................ F02P 9/002 |
| 2019/0078522 A1* | 3/2019 | Tamaskar .............. F02D 41/008 |
| 2020/0102900 A1* | 4/2020 | Kolhouse .............. F02D 35/021 |

FOREIGN PATENT DOCUMENTS

| | | |
|---|---|---|
| CN | 104937254 | 9/2015 |
| CN | 104975956 | 10/2015 |
| CN | 105317571 | 2/2016 |
| CN | 105683542 | 6/2016 |
| EP | 2581590 | 4/2013 |
| GB | 2458968 | 10/2009 |
| GB | 2473481 | 6/2015 |
| JP | 2009047130 | 3/2009 |
| WO | 201506674 | 5/2015 |

\* cited by examiner

TECHNIQUES FOR TRANSIENT ESTIMATION AND COMPENSATION OF CONTROL PARAMETERS FOR DEDICATED EGR ENGINES

RELATED APPLICATIONS

This application is a continuation of PCT Application No. PCT/US17/42755 filed Jul. 19, 2017, the content of which are incorporated herein by reference.

BACKGROUND

The present application relates to control strategies for dedicated exhaust gas recirculation (EGR) engines and more particularly, but not exclusively, to transient estimation and compensation of air handling and combustion control parameters for dedicated EGR engines. Such combustion control parameters may be utilized as inputs by multiple engine control systems including air handling, fueling, EGR, spark and torque control subsystems among others. Dedicated EGR engines typically include one or more cylinders which are dedicated to the provision of EGR via an EGR flow loop and one or more non-dedicated cylinders. Dedicated EGR engines offer the potential for increased EGR quality as the fueling of one or more dedicated EGR cylinders may be controlled to provide a rich combustion mixture resulting in increased combustible exhaust constituents such as $H_2$, CO and unburned hydrocarbon. On the other hand, dedicated EGR engines pose a number of difficult and longstanding control problems and unmet challenges. Variation in fuel quality, sensor error and error in estimation or determination of air, AFR, EGR, fueling and other combustion parameters contribute to such problems challenges. Such challenges and problems may be further compounded during transient events such as tip in, tip out, fuel cuts, cranking or other non-steady state operating conditions. There remains a significant unmet need for the unique apparatuses, methods, systems and techniques disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One embodiment is a system comprising an engine including a dedicated EGR cylinder configured to provide EGR to the engine via an EGR loop, a non-dedicated cylinder, a plurality of injectors structured to inject fuel into dedicated EGR cylinder and the non-dedicated EGR cylinder, and an electronic control system operatively coupled with the injectors and structured to determine one or more combustion control parameters for the engine. In certain forms the electronic control system is responsive to variation of one or more of inert matter, unburned air and unburned fuel in EGR output by the dedicated EGR cylinder(s). In certain forms the electronic control system is responsive to an effect one or more of the EGR loop on inert mass, unburned air mass and unburned fuel input to the cylinders. Further embodiments, forms, objects, features, advantages, aspects, and benefits shall become apparent from the following description and drawings.

DESCRIPTION OF ILLUSTRATIVE EMBODIMENTS

Figure 1:
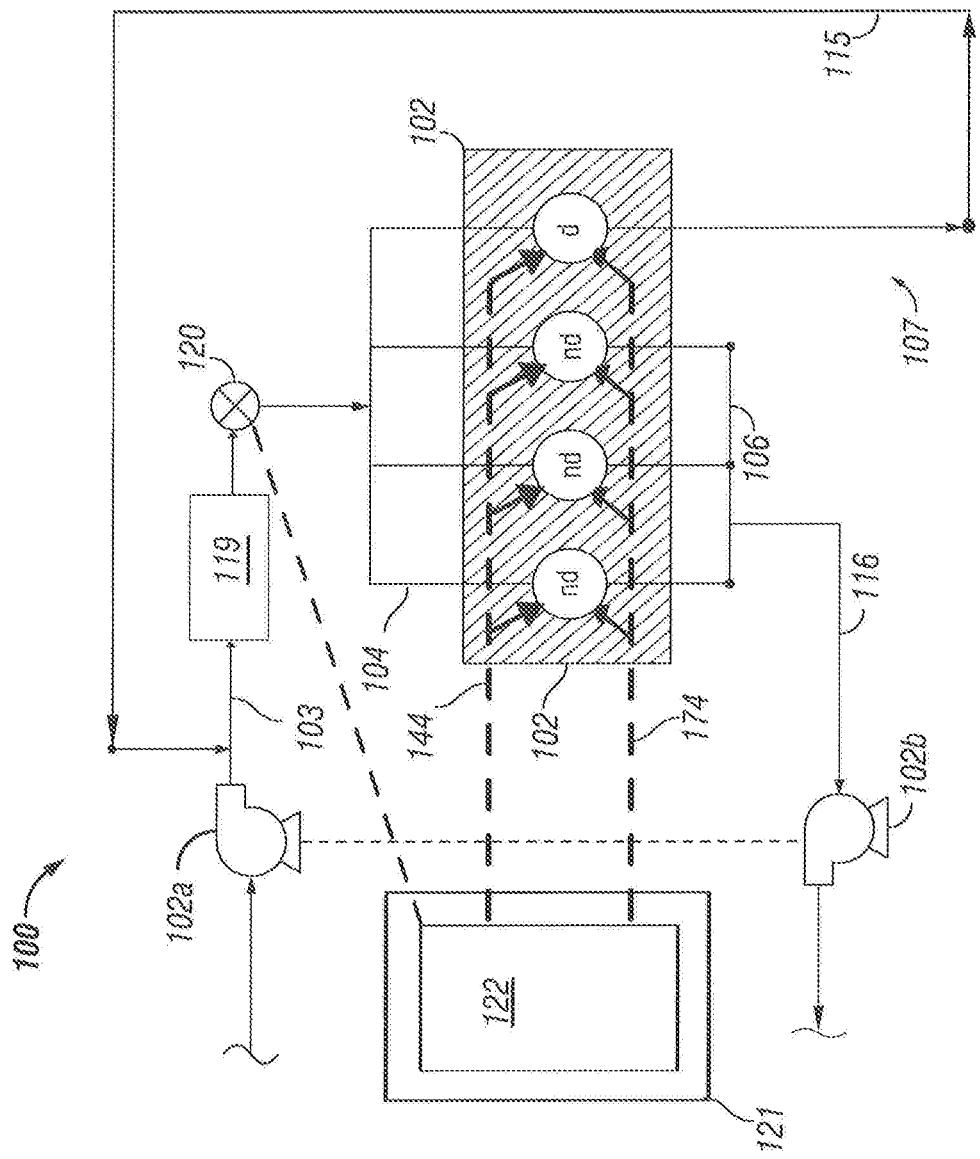
FIGS. 1 and 2 are schematic illustration of certain aspects of exemplary dedicated EGR engine systems.

With reference to FIG. 1, there is illustrated a system 100 including an exemplary dedicated EGR engine 102. Engine 102 includes a plurality of cylinders including a dedicated EGR cylinder (d) which is structured to provide EGR to EGR loop 107, and non-dedicated cylinders (nd) which are structured to provide exhaust to exhaust manifold 106. Engine 102 further includes a turbocharger including compressor 102a and turbine 102b. Turbine 102b receives exhaust from exhaust manifold 106 via exhaust conduit 116 effective to drive compressor which compresses intake air and discharges to intake conduit 103. Engine 102 is one example of a dedicated EGR engine in which the exhaust output of one or more dedicated EGR cylinders is recirculated to the engine intake during at least certain operating conditions. Dedicated EGR cylinders are generally structured to provide exhaust output which is separate from exhaust output provided by non-dedicated cylinders, during at least certain dedicated EGR operation modes.

During operation of system 100, EGR gas from the dedicated EGR cylinder is recirculated through EGR loop 107 which includes EGR conduit 115. EGR is then combined with intake flow, for example, via a mixer. In the illustrated embodiment EGR is combined with the intake conduit 103 at a location downstream of and proximate the outlet of compressor 102a and upstream of intake manifold 104, intake throttle 120 and charge air cooler 119. It shall be appreciated that in other embodiments, EGR may be introduced in various other locations in the intake air system downstream of compressor 102a.

System 100 further includes an electronic control system 121 including an electronic control unit 122 which may include one or more microprocessors, microcontrollers, application specific integrated circuits (ASICs), non-transitory memory devices, and communication or networking interfaces. Electronic control system 121 is operatively coupled with ignition system 174 which includes a plurality of spark plugs (illustrated with arrows) structured to ignite a charge mixture in respective ones of the dedicated EGR cylinder and the non-dedicated cylinders. Electronic control system 121 is also operatively coupled with fueling system 144 which includes a plurality of injectors (illustrated with arrows) structured to inject fuel into respective ones of the dedicated EGR cylinder and the non-dedicated cylinders. In the illustrated embodiment, the injectors of fueling system are provided as direct injectors which inject fuel directly into the cylinder volume and are capable of delivering fuel into the cylinder volume when the intake valve(s) and exhaust valve(s) are closed. The direct injector may be structured to inject fuel at the top of the cylinder. In certain embodiments, one or more direct injectors may be structured to inject fuel into a corresponding one or more combustion pre-chambers or at other locations in the intake system. In certain embodiments pre-mixed or port injection systems may be provided and utilized for all cylinders and one or more direct injectors may be provided for providing additional fueling to one or more dedicated cylinders while the non-dedicated cylinders are fueled only via the pre-mixed or port injection. Additionally, in certain embodiments pre-mixed or port injection may be utilized for only the non-dedicated cylinders and one or more direct injectors may be utilized only for one or more dedicated cylinders.

In certain forms electronic control system 121 is structured to execute control operations effective to control fueling of the dedicated EGR cylinder and the non-dedicated cylinders independently from one another. Such independent control permits the non-dedicated cylinders to be controlled in a first combustion mode (e.g., to provide stoichiometric combustion during operation of engine 102) and the dedicated EGR cylinder to be controlled in a second combustion mode which may differ from the first combustion mode (e.g., to provide rich combustion effective to generate exhaust gasses having characteristics which enhance the quality of EGR such as higher amounts of $H_2$, CO and unburned hydrocarbons).

In the illustrated embodiment, electronic control system 121 is structured to control the position of intake throttle 120. In further embodiments, electronic control system 121 is structured to control the position of an EGR valve, a wastegate or a variable geometry turbine. Electronic control system 121 is further structured to control the operation of other electronically controllable components associated with engine 102 or system 100. Electronic control system 121 is further structured to receive input from a number of sensors associated with system 100, for example, a first lambda or $O_2$ sensor may be structured to provide information indicative of the air-fuel ratio of the exhaust output by the non-dedicated cylinders and a second lambda or $O_2$ sensor may be structured to provide information indicative of the air-fuel ratio of the exhaust output by the dedicated EGR cylinder.

Electronic control system 121 is structured to implement the controls and perform the control operations described in connection with FIGS. 2-9. Such implementation and operation may include acts of determining certain values or parameters described herein. It shall be appreciated that determination of such values or parameters may comprise a number of operations, including calculation or computation, estimation, floating point operations, operating a look up table and a various other acts as would occur to one of skill in the art with the benefit of the present disclosure.

In the exemplary embodiment of FIG. 1, system 100 includes a dedicated EGR engine 102 which is provided as a turbocharged, four-cylinder, spark ignition (SI) engine with direct in-cylinder injection. It shall be appreciated that engine 102 may be provided in a variety of alternate forms varying from the illustrated embodiment in a number of respects. Engine 102 may be provided with additional or alternately-configured turbochargers or may be provided as a non-turbocharged or naturally aspirated engine. Engine 102 may be provided with a different numbers of cylinders and a different number of dedicated EGR cylinders, for example, as a six-cylinder engine with two dedicated EGR cylinders or a different number of total cylinders and dedicated EGR cylinders. Regardless of the total number of cylinders, the number of dedicated EGR cylinders may vary as a fixed design parameter, as a controllable system operating parameter by selecting which of a plurality of dedicated EGR cylinders is flow coupled with the EGR loop, or both. Engine 102 may also be provided as a compression ignition engine such as a diesel engine or a dual fuel engine.

It shall be appreciated that system 100 and engine 102 may be provided in a variety of alternate forms varying from the illustrated embodiment in a number of respects. In certain forms the EGR loop may include an EGR valve structured to selectably vary the provision of exhaust to EGR loop 107 and to exhaust conduit 116 or a bypass valve capable of bypassing the EGR loop. In certain forms the EGR loop may include an EGR cooler and an EGR cooler bypass valve. In certain forms a dedicated throttle may be structured to selectably control the provision of charge air to the dedicated EGR cylinder independently from the non-dedicated cylinders. Further details of a number of examples of variation in the form and structure of system 100 and engine 102 may be found in commonly assigned U.S. Pat. No. 9,631,582 issued on Apr. 25, 2017 and entitled TECHNIQUES FOR CONTROLLING A DEDICATED EGR ENGINE the disclosure of which is hereby incorporated by reference. It shall be appreciated that in certain variations of the embodiments disclose herein, additional fuel may be introduced via an injector structured to inject fuel into the exhaust manifold of the dedicated cylinder and a water gas shift catalyst may be provided downstream of the direct cylinder exhaust manifold and utilized to convert the unburned fuel from both the cylinder and the additional injector to hydrogen. In further embodiments, a post-combustion injection to a dedicated cylinder by a direct injector may be utilized to add additional fuel to the cylinder which is then provided to a water gas shift catalyst downstream of the dedicated cylinder exhaust manifold to produce hydrogen.

Figure 2:
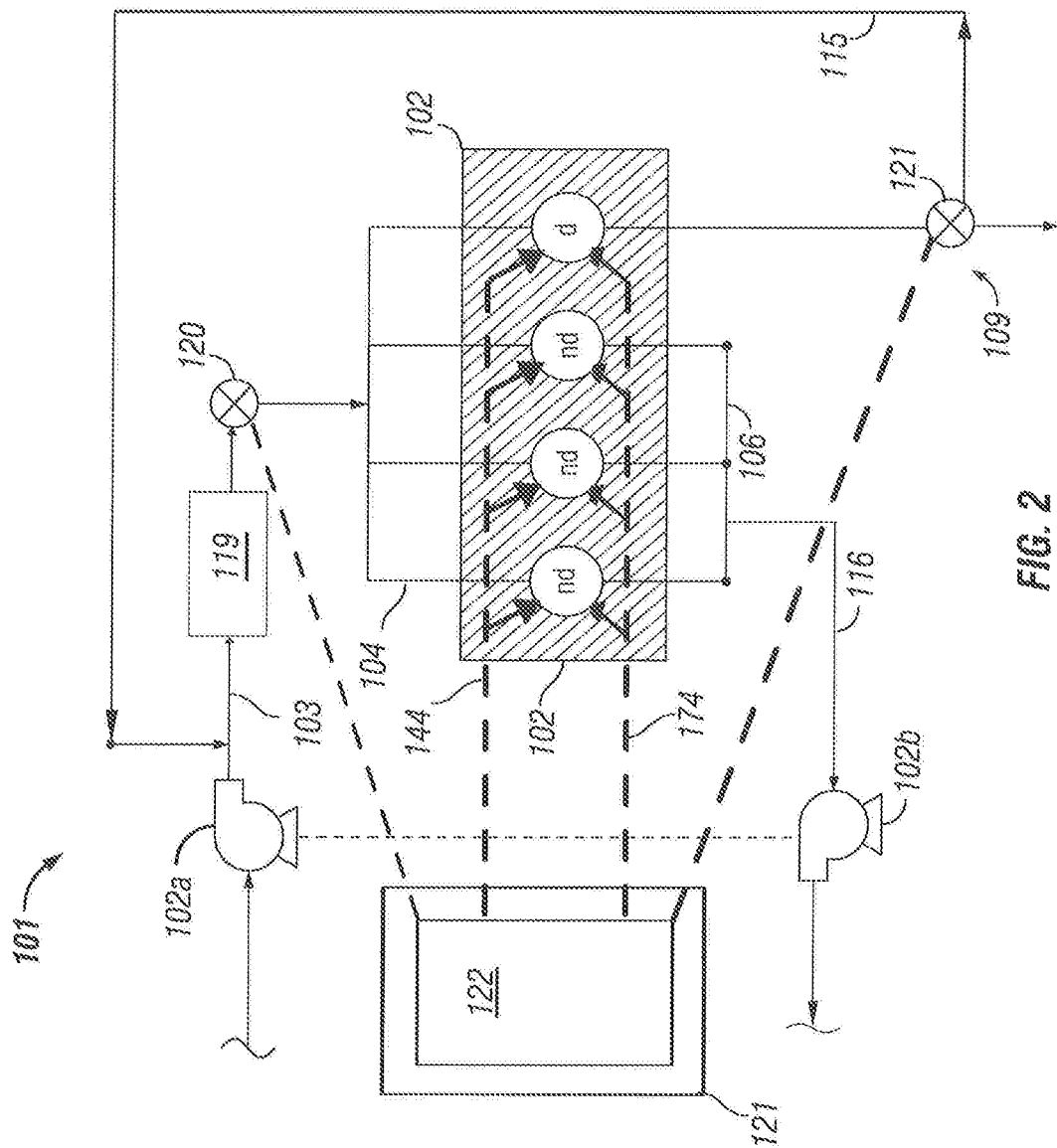

With reference to FIG. 2, there is illustrated a system 101 including a number of substantially similar features as those illustrated and described in connection with FIG. 1 which are labeled with like reference numerals as those of FIG. 1. System 101 further includes an EGR valve 121. In the illustrated embodiment EGR valve 121 is provided as a proportional three-way valve which is controllable by an electronic control system to selectably route exhaust through EGR loop 109 to the intake of dedicated EGR engine 102 or to an exhaust system such as an aftertreatment system and tailpipe in variable proportion. In certain embodiments, the exhaust flow from EGR valve 121 may be routed to a location upstream of the turbine of the turbocharger to contribute to turbocharging. In further embodiments, the EGR valve may be provided as a proportional flow valve configured to vary the flow or fraction of EGR to the dedicated EGR engine but without providing any direct flow path to an exhaust system.

Figure 3:
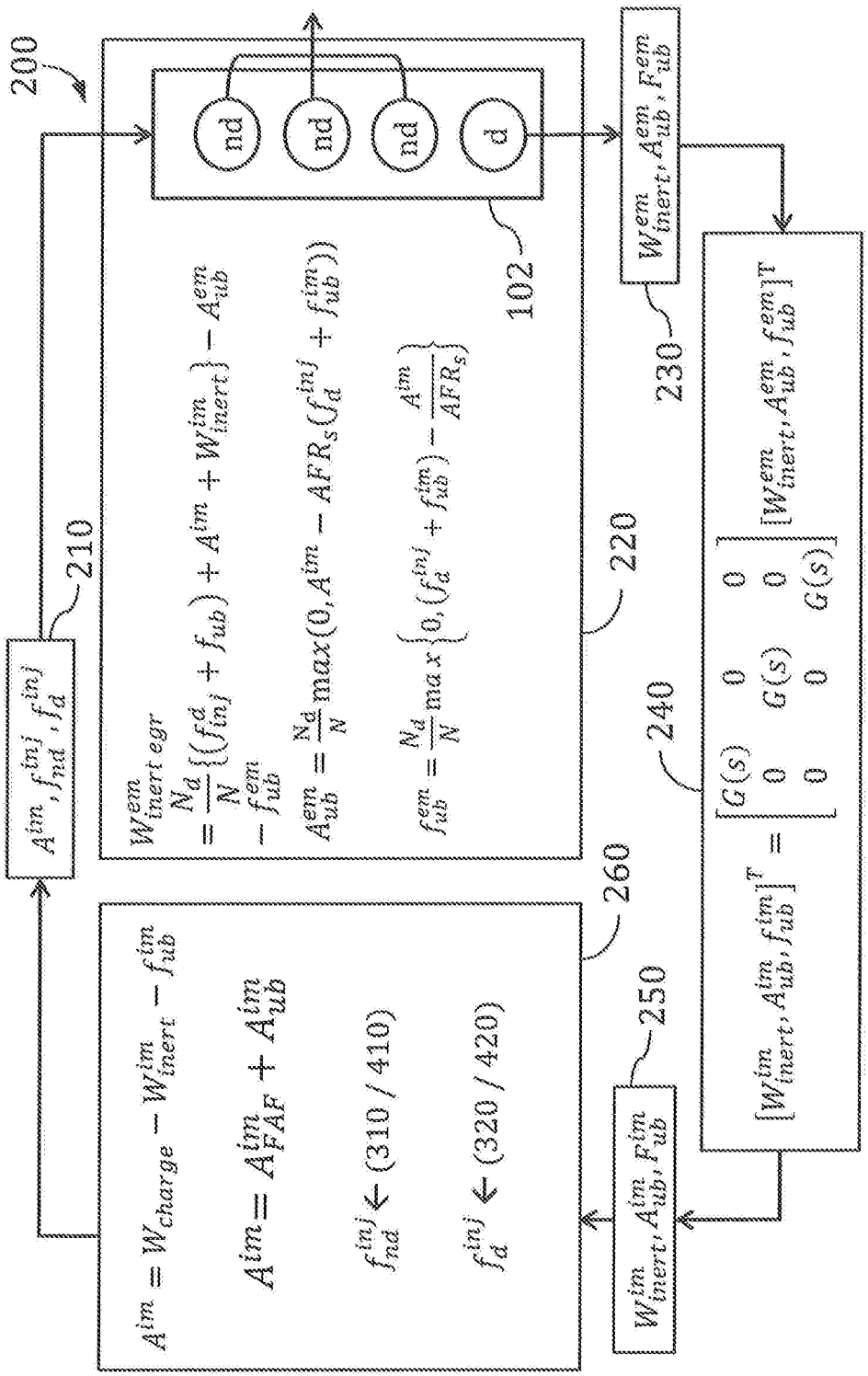
FIGS. 3-5 are schematic illustration of certain aspects of exemplary controls for dedicated EGR engines.

With reference to FIG. 3 there is illustrated a schematic diagram of an exemplary control process 200 for a dedicated EGR engine such as engine 102. Process 200 includes a number of control operations which may be performed by an electronic control system such as electronic control system 121. Process 200 further includes a number of operations which may controllably occur in connection with the mechanical and fluidic physical components of a system including a dedicated EGR engine such as system 100.

In process 200, certain controllable combustion inputs 210 are provided to the non-dedicated cylinders and the dedicated EGR cylinder (d) of engine 102. Controllable combustion inputs 210 comprise intake air provided to the intake manifold of engine 102 ($A^{im}$), fuel injected into the non-dedicated cylinders of engine 102 ($f_{nd}^{inj}$) and fuel injected into the dedicated EGR cylinder of engine 102 ($f_d^{inj}$). Controllable combustion inputs $f_{nd}^{inj}$ and $f_d^{inj}$ are controllable by a non-dedicated fueling controller and a dedicated fueling controller which may be implemented or provided in one or more electronic control units of an electronic control system such as electronic control unit 122 of electronic control system 121. The non-dedicated fueling controller and the dedicated fueling controller may be structured to determine fueling parameters such as non-dedicated fueling values and dedicated fueling values which are utilized in controlling fuel injectors configured to inject fuel into the non-dedicated cylinders and the dedicated EGR cylinder, respectively. It shall be appreciated that parameters such as controllable combustion inputs 210 may be expressed, calculated, manipulated and stored in a number of terms of including mass fraction, mass, mass flow rate, injector on-time and injector rail pressure among others. It shall be further appreciated that other combustion or charge constituents and the combustion control parameters therefore which are disclosed herein may be expressed, calculated, manipulated and stored in a number of terms of including mass fraction, mass and mass flow rate among others.

The non-dedicated cylinders and dedicated EGR cylinder of engine 102 receive their respective controllable combustion inputs, combust these inputs and output exhaust constituents via respective exhaust output flow paths. The exhaust constituents of the non-dedicated cylinders may be routed to an exhaust system including one or more aftertreatment components. The exhaust constituents 230 of the dedicated EGR cylinder may be routed to the engine intake via an EGR loop, for example, EGR loop 107 illustrated and described in connection with FIG. 1. Exhaust constituents 230 comprise exhaust constituents present at the exhaust manifold or outlet of the dedicated EGR cylinder. Exhaust constituents 230 comprise inert exhaust constituents ($W_{inert}^{em}$) such as $CO_2$, $H2O$ unburned air constitutes ($A_{ub}^{em}$) such as $O_2$ and $N_2$, and unburned fuel constituents ($F_{ub}^{em}$), e.g., $H_2$, CO and hydrocarbons. When the dedicated EGR cylinders are run rich the EGR contains inert and unburnt fuel constituents, When the dedicated cylinders are run stoichiometric the EGR contains only inert components and when dedicated cylinders are run in a lean or fuel cut mode the EGR contains unburnt air and inert gasses. It shall be further appreciated that, in instances where the fuel is cut, the EGR path may contain only air. Additionally, during a fuel cut event a combination of air and residual exhaust constituents may be present in the EGR path for a period of time and thereafter the path may contain only air. Another case is misfire of the dedicated cylinder when no combustion happens or incomplete combustion occurs and the unburned fuel vapor and air are released into the exhaust.

At operation 220 estimated values of exhaust constituents 230 may be determined by one or more electronic control units of an electronic control system such as electronic control unit 122 of electronic control system 121 in accordance with equations (1), (2) and (3), respectively.

$$W_{inert}^{em} = \frac{N_d}{n}\{(f_d^{inj} + f_{ub}^{im}) + A^{im} + W_{inert}^{im}\} - A_{ub}^{em} - f_{ub}^{em} \quad (1)$$

$$A_{ub}^{em} = \frac{N_d}{N}\max(0, A^{im} - AFR_s(f_d^{inj} + f_{ub}^{im})) \quad (2)$$

$$f_{ub}^{em} = \frac{N_d}{N}\max\left\{0, (f_d^{inj} + f_{ub}^{im}) - \frac{A^{im}}{AFR_s}\right\} \quad (3)$$

wherein $N_d/N$ is the ratio of the number of dedicated EGR cylinder to the total number of cylinders, $f_{inj}^d$ is the fuel injected into the dedicated EGR cylinder, $f_{ub}$ is unburned fuel contained in the intake charge which is provided via the EGR loop, $A^{im}$ is intake manifold air, $W_{inert}^{im}$ intake manifold inert matter, $A_{ub}^{em}$ is unburned air output by the dedicated EGR cylinder(s) to an EGR loop, $f_{ub}^{em}$ is unburned fuel output by the dedicated EGR cylinder to an EGR loop, and $AFR_S$ is a stoichiometric air-fuel ratio.

During operation of dedicated EGR engine 102, the exhaust constituents 230 are provided to the engine intake as denoted by intake constituents 250 present at the intake manifold which leads to both the dedicated and non-dedicated cylinders of engine 102. Intake constituents 250 comprise inert intake constituents ($W_{inert}^{im}$) such as $CO_2$, unburned air constituents ($A_{ub}^{im}$) such as $O_2$ and $N_2$, and unburned fuel constituents ($F_{ub}^{im}$) such as $H_2$, CO and hydrocarbons. At any given time, however, exhaust constituents 230 and intake constituents 250 may diverge from one another and such divergence may be dynamic and heretofore unpredictable. Such divergence may occur, for example, during engine cranking, fuel cuts and transient events such as acceleration and deceleration events. Such divergence may be attributable to a number of characteristics of the physical engine system, for example, the combined pumping volume of the EGR loop and the intake system downstream from the EGR loop may introduce a transport delay or divergence between exhaust constituents 230 and intake constituents 250. Additional delay or divergence may be introduced by the gas mixing effects imparted by components of the EGR loop (e.g., an EGR cooler) and/or components of the intake system (e.g., a charge air cooler such as charge air cooler 119).

At operation 240 estimated values of intake constituents 250 may be calculated from exhaust constituents 230 and a transform operator G(s). In the illustrated form transform operator G(s) is implemented as a matrix operator having operator terms G(s) on its diagonal. It shall be appreciated that the operator terms G(s) on the diagonal of the matrix need not be identical and may comprise distinct terms G(s)1, G(s)2, ... G(s)n for a matrix of arbitrary size n. It shall be appreciated that transform operator may be implemented in a variety of other forms, including explicit calculations, formulae, lookup tables and other techniques as would occur to one of skill in the art with the benefit of the present disclosure. It shall be further appreciated that mass fraction calculations and other determinations, such as mass, injector on-time and rail pressure, can be utilized instead of flow rate. Regardless of the selected implementation, operation 240 is effective to determine estimated values for intake constituents 250 which are provided to and utilized by operation 260.

Operation 260 is structured to determine control values for controllable combustion inputs 210. A value of the intake air provided to the intake manifold of engine 102 ($A^{im}$) may be determined in in accordance with equation (4.2) if a charge flow is sensor is utilized and in accordance with equation (4.1) if a fresh air mass flow sensor is utilized.

$$A^{im} = A_{FAF}^{im} + A_{ub}^{im} \quad (4.1)$$

$$A^{im} = W_{charge} - W_{inert}^{im} - f_{ub}^{im} \quad (4.2)$$

wherein $W_{charge}$ is the total intake charge mass flow which may be determined by a mass flow sensor which may be physical, virtual or hybrid thereof, and $W_{inert}^{im}$ and $f_{ub}^{im}$ are determined in connection with operation 240. The value of fuel injected into the non-dedicated cylinders of engine 102 ($f_{nd}^{inj}$) and fuel injected into the dedicated EGR cylinder of engine 102 and ($f_d^{inj}$) may be determined using the controls described in connection with FIG. 4 or the controls described in connection with FIG. 5. It shall be appreciated that when process 200 is controlled to provide stoichiometric (l=1) steady state combustion in all cylinders of engine 102, $A_{ub}^{im}=0$, and $f_{ub}^{im}=0$. When the dedicated EGR cylinder (d) of engine 102 is controlled to run rich (l<1), such as when providing EGR, the value of $f_{ub}^{im}>0$. When the dedicated EGR cylinder of engine 102 is controlled to run lean (l>1), such as during a fuel reduction or cut off or engine cranking, the value of $A_{ub}^{im}>0$. It shall be appreciated that techniques in accordance with either equation 4.1 or equation 4.2 may be utilized depending on the sensor configuration of the system in which they are implemented.

Figure 4:
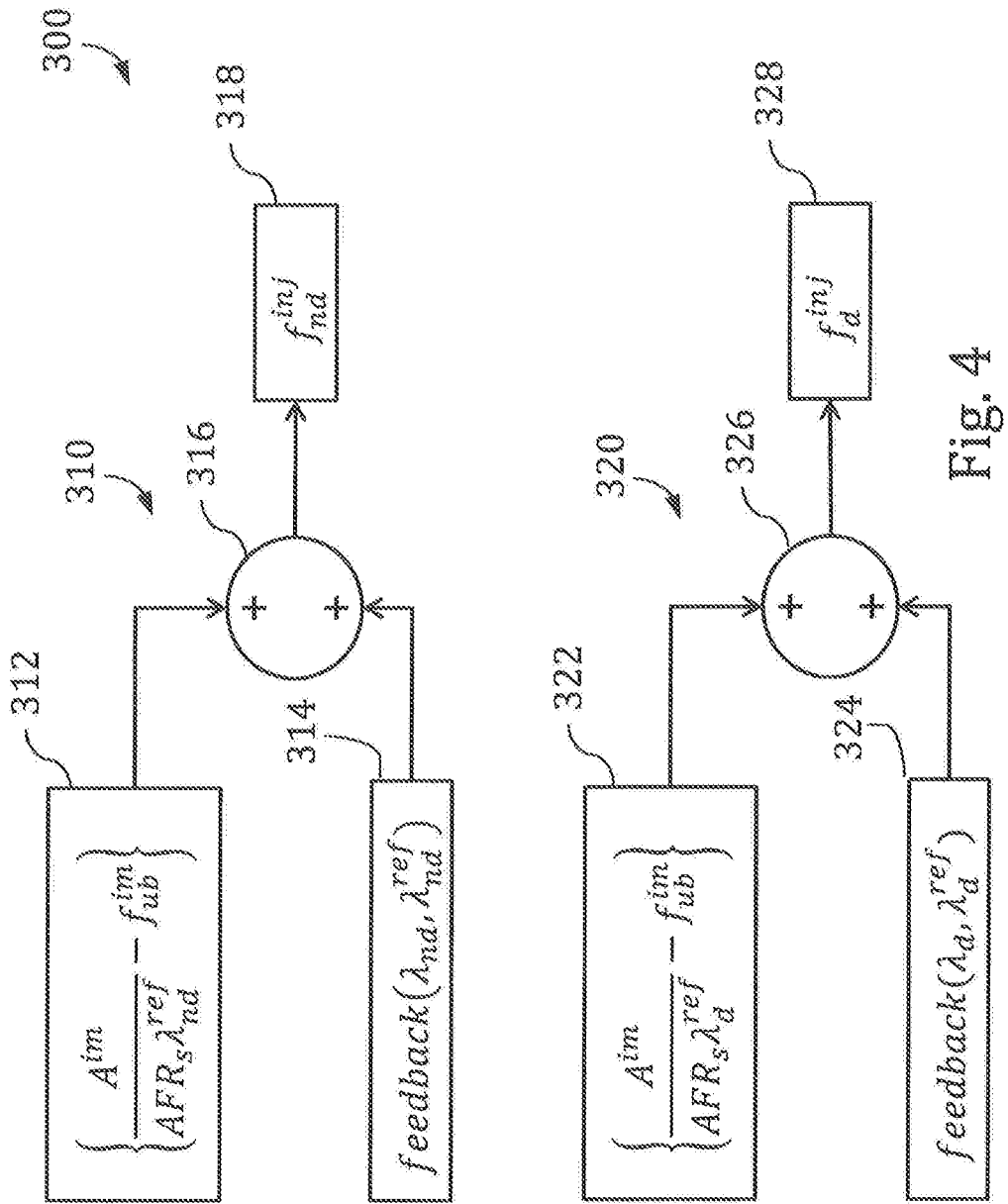

With reference to FIG. 4 there is illustrated a schematic diagram of exemplary controls 300 which include non-dedicated fueling controls 310 and dedicated fueling controls 320 which may be implemented or provided in one or more electronic control units of an electronic control system such electronic control unit 122 of electronic control system 121. While certain embodiments herein are illustrated and described in the context of fueling or AFR controls, one or skill in the art equipped with the benefit of the present disclosure shall appreciated that the techniques disclosed therein can be applied to a variety of other combustion control parameters such as those disclosed herein.

Non-dedicated fueling controls 310 includes a feedforward controller 312 which is structured to determine and output a feedforward value and a feedback controller 314 which is structured to determine and output a feedback value. Non-dedicated fueling controls 310 further include an operator 316 which is structured to receive and add the values determined by feedforward controller 312 and feedback controller 314 to determine and output a value 318 for controllable combustion input $f_{nd}^{inj}$ which may be utilized to control fuel injection into the non-dedicated cylinders of engine 102.

Feedforward controller 312 is structured to determine and output a feedforward value in accordance with equation (5).

$$FFout = \left\{ \frac{A^{im}}{AFR_s \lambda_{nd}^{ref}} - f_{ub}^{im} \right\} \quad (5)$$

wherein FFout is the value output by controller 312, $A^{im}$ is the intake air provided to the intake manifold of engine 102 which may be determined as described in connection with operation 240, $AFR_S$ is a stoichiometric air-fuel ratio, $\lambda_{nd}^{ref}$ is a lambda control reference value for the non-dedicated cylinders which may be set to provide desired operation of engine 102 (e.g., if stoichiometric operation is desired $\lambda_{nd}^{ref}$ is set equal to 1), and $f_{ub}^{im}$ is unburned fuel constituents present at the intake manifold which may be determined in connection with operation 240.

Feedback controller 314 is structured to determine and output a feedback value in accordance with equation (6).

$$FBout = feedback(\lambda_{nd}, \lambda_{nd}^{ref}) \quad (6)$$

wherein FBout is the value output by controller 314, $\lambda_{nd}$ is a lambda value determined by a first lambda sensor or $O_2$ sensor structured to sense a lambda value of exhaust output from the non-dedicated cylinders, and $\lambda_{nd}^{ref}$ is a lambda reference value for exhaust output from the non-dedicated cylinders which may be set and adjusted by an electronic control system to achieve a desired combustion state for the non-dedicated cylinders. It shall be appreciated that feedback controller 314 may be implemented in a number of feedback or closed loop forms, including a proportional integral derivative (PID) controller implementation and variants thereof such as a proportional integral (PI) controller implementation.

Dedicated fueling controls 320 include a feedforward controller 322 which is structured to determine and output a feedforward value and a feedback controller 324 which is structured to determine and output a feedback value. Dedicated fueling controls 320 further include an operator 326 which is structured to receive and add the values determined by feedforward controller 312 and feedback controller 314 to determine and output a value 328 for controllable combustion input $f_d^{inj}$ which may be utilized to control fuel injection into the dedicated EGR cylinder of engine 102.

Feedforward controller 322 is structured to determine and output a feedforward value in accordance with equation (7).

$$FFout = \left\{ \frac{A^{im}}{AFR_s \lambda_d^{ref}} - f_{ub}^{im} \right\} \quad (7)$$

wherein FFout is the value output by controller 312, $A^{im}$ is the intake air provided to the intake manifold of engine 102 which may be determined as described in connection with operation 240, $AFR_S$ is a stoichiometric air-fuel ratio, $\lambda_d^{red}$ is a lambda control reference value for the dedicated EGR cylinder which may be set to provide desired operation of engine 102 (e.g., if rich operation is desired $\lambda_d^{ref}$ is set less than one 1), and $f_{ub}^{im}$ is unburned fuel constituents present at the intake manifold which may be determined in connection with operation 240.

Feedback controller 324 is structured to determine and output a feedback value in accordance with equation (8).

$$FBout = feedback(\lambda_d, \lambda_d^{ref}) \quad (8)$$

wherein FBout is the value output by controller 324, $\lambda_d$ is a lambda value determined by a second lambda sensor or $O_2$ sensor structured to sense a lambda value of exhaust output from the dedicated EGR cylinder, and $\lambda_d^{ref}$ is a lambda reference value for exhaust output from the dedicated EGR cylinder which may be set and adjusted by an electronic control system to achieve a desired combustion state for the dedicated EGR cylinder. It shall be appreciated that feedback controller 324 may be implemented in a number of feedback or closed loop forms, including a proportional integral derivative (PID) controller implementation and variants thereof such as a proportional integral (PI) controller implementation.

Figure 5:
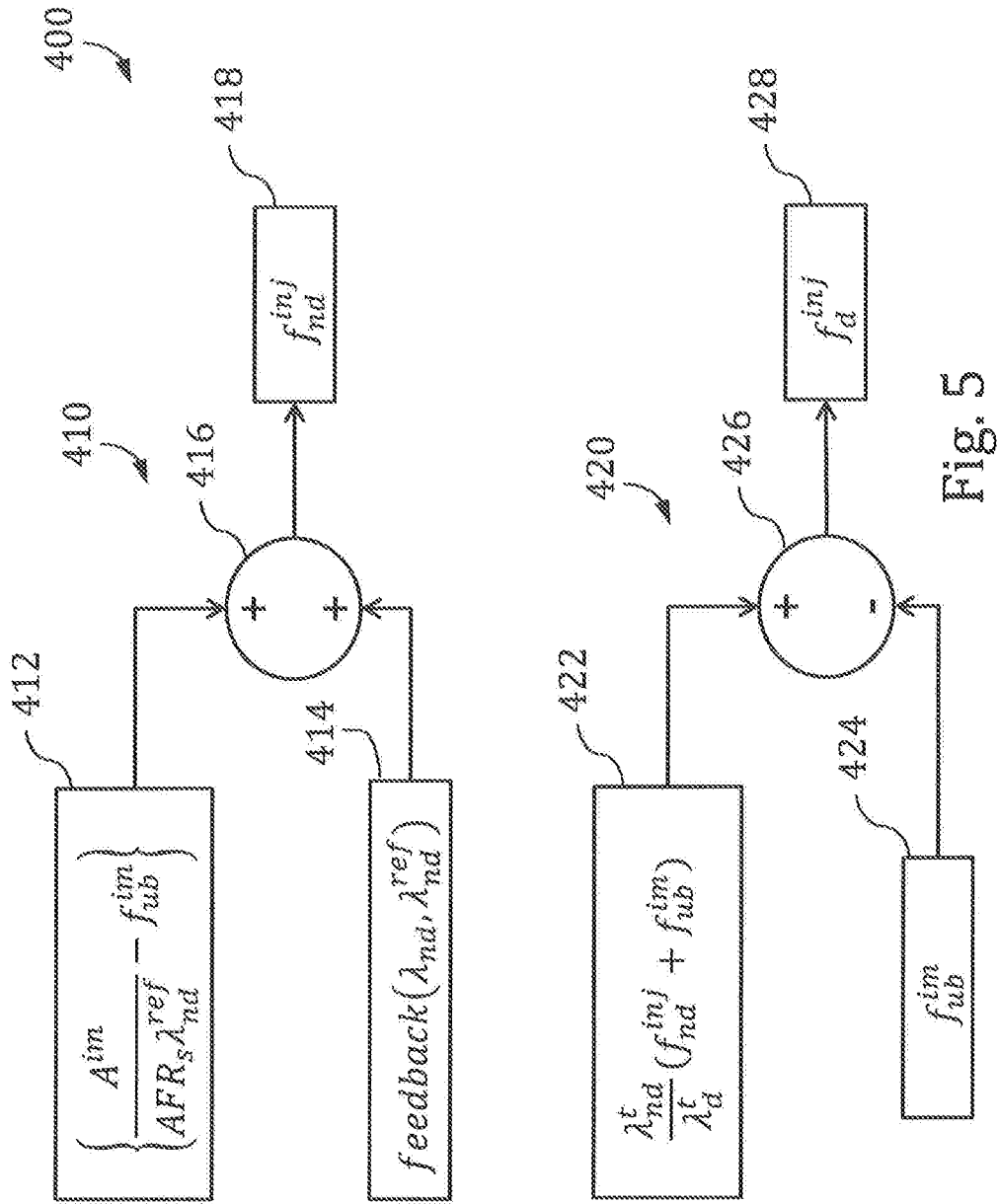

With reference to FIG. 5 there is illustrated a schematic diagram of exemplary controls 400 which include non-dedicated fueling controls 410 and dedicated fueling controls 420 which may be implemented or provided in one or more electronic control units of an electronic control system such as electronic control unit 122 electronic control system 121. Non-dedicated fueling controls 410 correspond to and include substantially similar operations as non-dedicated controls 310. In particular, feedforward controller 412 corresponds to and is substantially similar to feedforward controller 312, feedback controller 414 corresponds to and is substantially similar to feedback controller 314, operator 416 corresponds to and is substantially similar to operator 316 and output and value 418 corresponds to and is substantially similar to value 318.

Dedicated fueling controls 420 include feedback controller 422 which is structured to determine and output a feedback control value in accordance with equation (9).

$$FBout = \frac{\lambda_{nd}^t}{\lambda_d^t}(f_{nd}^{inj} + f_{ub}^{im}) \qquad (9)$$

wherein FBout is the value output by controller 422, $\lambda_{nd}^t$ is a lambda target for the non-dedicated cylinders, $\lambda_d^t$ is a lambda target for the dedicated EGR cylinder, $f_{nd}^{inj}$ is fuel injected into the non-dedicated cylinders, and $f_{ub}^{im}$ is unburned fuel provided to the intake manifold by EGR flow.

The output of feedback controller is provided to operator 426 which is also provided with an input 242 of the value $f_{ub}^{im}$. Operator 426 subtracts the input 242 from the input received from feedback controller 422 and outputs a value 428 for controllable combustion input $f_d^{inj}$ which may be utilized to control fuel injection into the dedicated EGR cylinder of engine 102.

Figure 6:
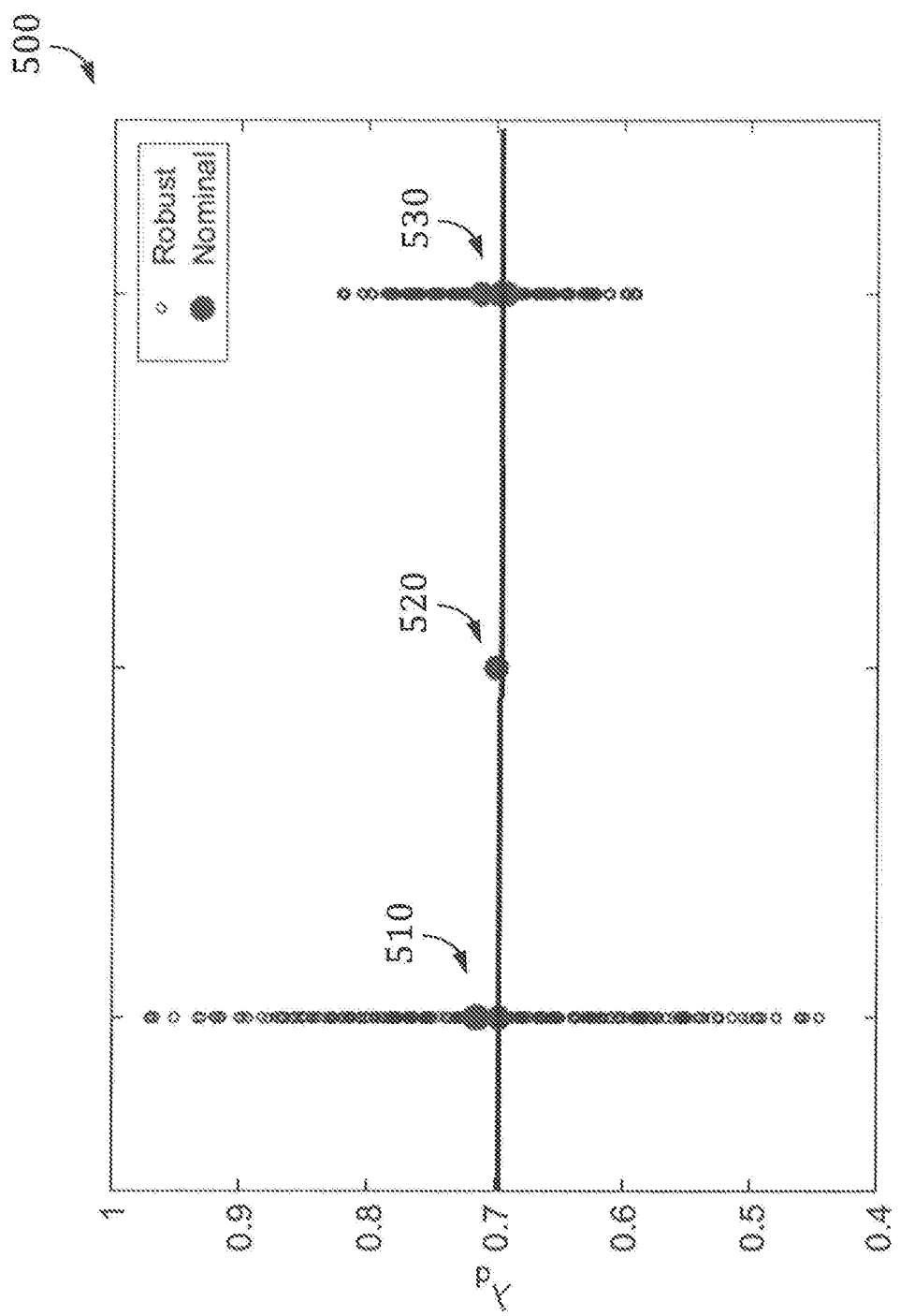
FIG. 6 is a graph illustrating certain aspects of simulation test results for exemplary dedicated EGR engine controls.

With reference to FIG. 6 there is illustrated a graph 500 depicting simulation results illustrating variation in the dedicated EGR cylinder lambda parameter ($l_d$) for dedicated EGR engine systems utilizing the controls illustrated and described in connection with FIGS. 3-5 as well as results for a dedicated EGR engine system which utilizes only feedforward correction in the dedicated cylinder for unburned EGR constituents and utilizes feed forward and feedback in the dedicated cylinder path. Graph 500 depicts both nominal simulation results for an idealized system and robust simulation results for a system in which variation or error in engine speed, engine load, engine intake air, dedicated EGR cylinder fueling, non-dedicated cylinder fueling and air-fuel ratio have been introduced. Data set 510 depicts the results for a system which utilizes only feed forward control in the dedicated cylinder path and feedback control in the non-dedicated cylinder path, for example, controls similar to what is shown in FIG. 4 but without feedback path 324. Data set 520 depicts the idealized and robust results for a system which utilizes the controls of FIG. 4 which substantially eliminate variation in $l_d$ while requiring us to use an Oxygen sensor. Data set 530 depicts the idealized and robust results for a system which utilizes the controls of FIG. 5 which include variation in $l_d$ which is significantly reduced relative to data set 510 without employing any additional sensors.

Figure 7:
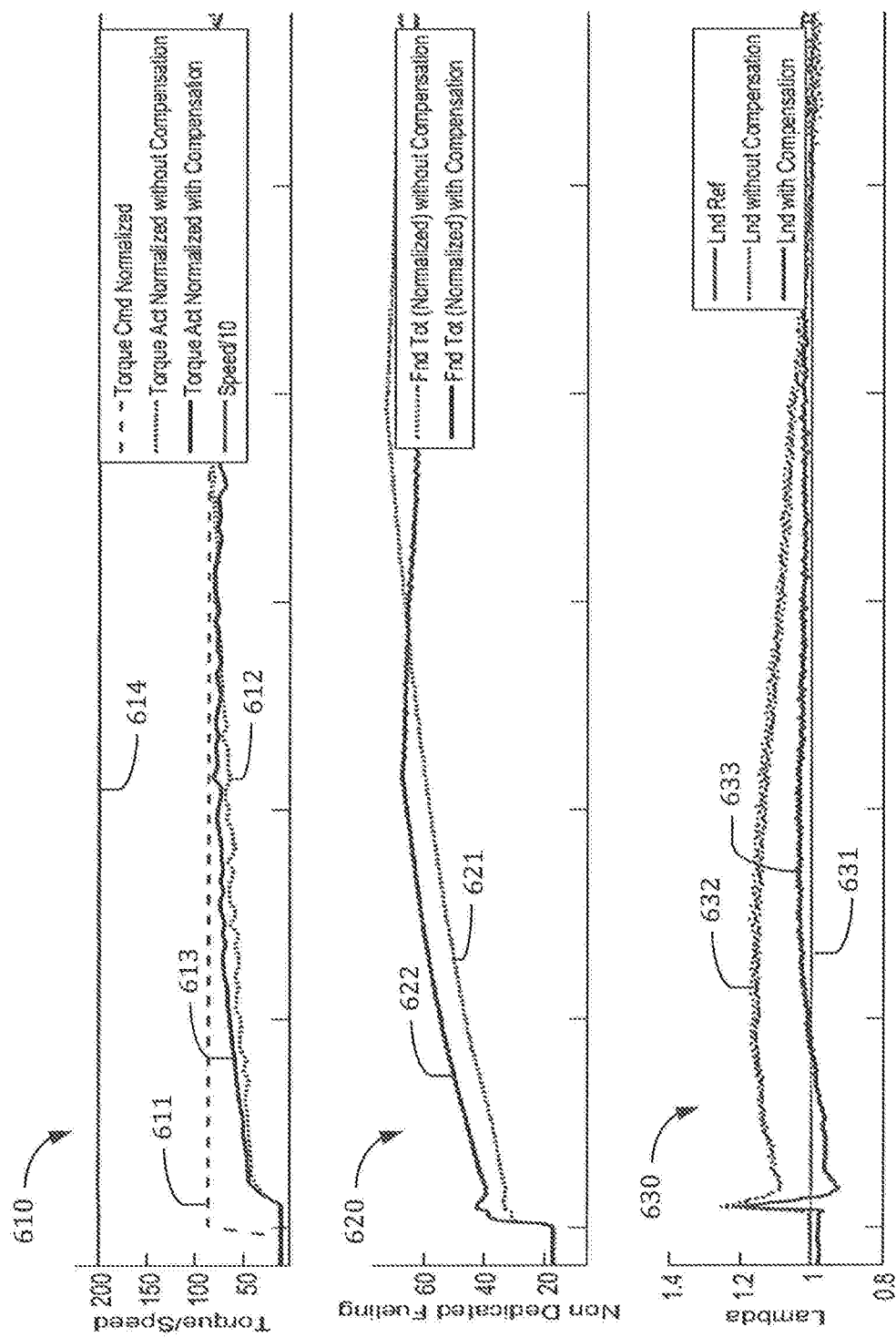
FIGS. 7 and 8 are graphs illustrating certain aspects of test cell test results for exemplary dedicated EGR engine controls.

With reference to FIG. 7 there are illustrated graphs 610, 620 and 630 depicting test cell results for a tip-in transient event (e.g., an operator depresses the accelerator pedal) during operation of a dedicated EGR engine system. Test cell results are shown for both controls which utilizes different types of correction for variation in EGR constituents and for controls which utilize a compensation as described herein.

Graph 610 depicts a normalized engine torque command curve 611, a normalized engine torque without compensation curve 612, a normalized engine torque with compensation curve 613, and a normalized engine speed curve 614. As can be seen by comparing curves 612 and 613 to curve 611, curve 613, which includes compensation, more quickly converges with and deviates less from the normalized torque command 611 than curve 612.

Graph 620 depicts fueling of the non-dedicated cylinder(s) of a dedicated EGR engine. Curve 621 shows normalized total fueling without compensation. Curve 622 shows normalized total fueling with compensation. As can be seen by comparing curves 621 and 622, the fueling value for curve 622, which includes compensation, initially shows a greater increase that curve 621, which is without compensation, but thereafter curve 622 converges at a lower fueling value thereby effective to provide lower fuel consumption over time.

Graph 630 depicts a non-dedicated cylinder lambda reference value curve 631, a non-dedicated cylinder lambda value without compensation curve 632 and a non-dedicated cylinder lambda value with compensation curve 633. As can be seen by comparing curves 632 and 633 to curve 631, curve 633, which includes compensation, more quickly converges with and deviates less from the non-dedicated cylinder lambda reference value 631 than curve 632, which is without compensation.

Figure 8:
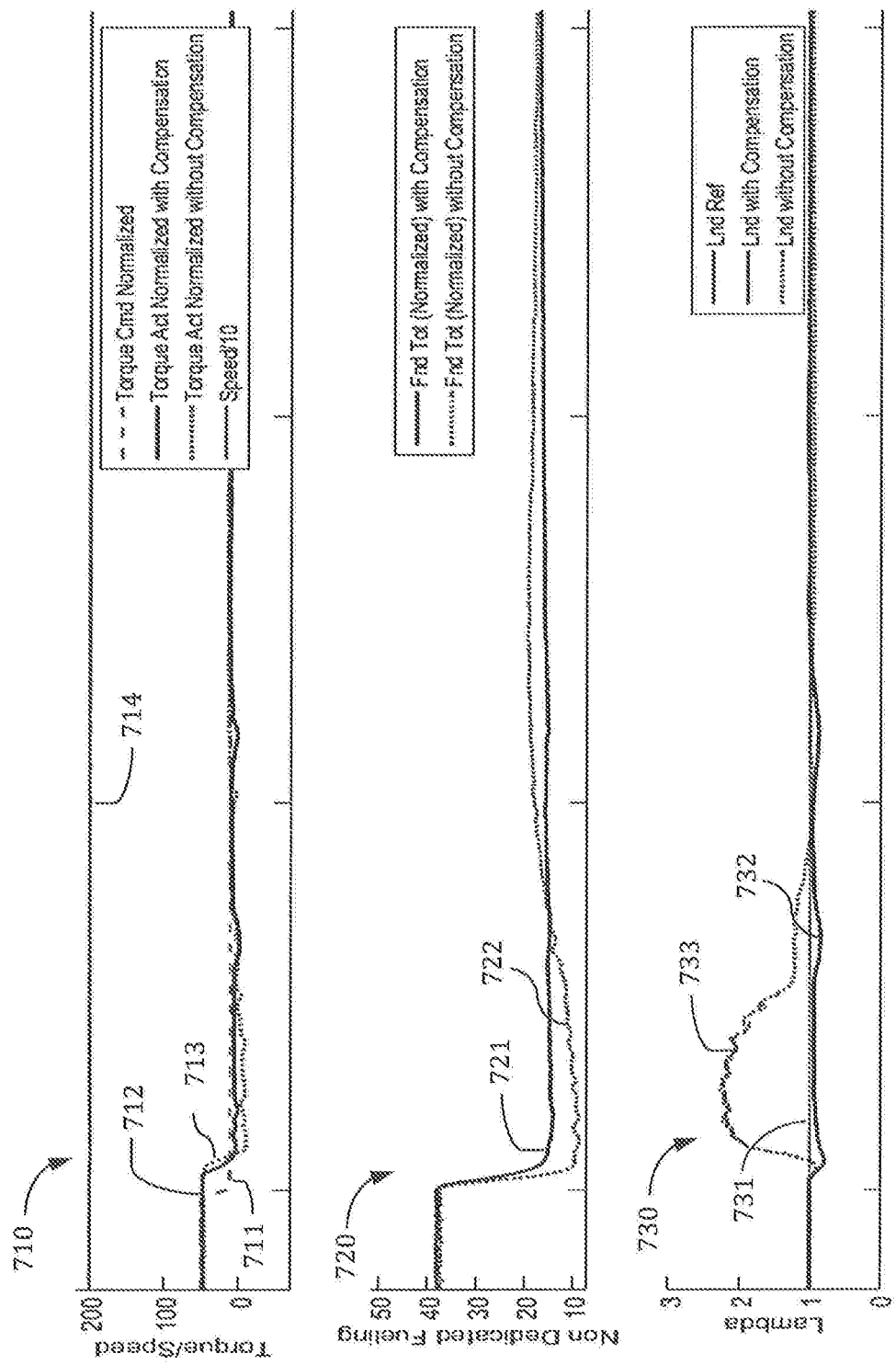

With reference to FIG. 8 there are illustrated graphs 710, 720 and 730 depicting test cell results for a tip-out transient event (e.g., an operator releases the accelerator pedal) during operation of a dedicated EGR engine system. Test cell results are shown for controls which utilizes different types of correction for variation in EGR constituents and for controls which utilize compensation as described in connection with FIG. 5.

Graph 710 depicts a normalized engine torque command curve 711, a normalized engine torque with compensation curve 712, a normalized engine torque without compensation curve 713, and a normalized engine speed curve 714. As can be seen by comparing curves 712 and 713 to curve 711, curve 712, which includes compensation, more quickly converges with and deviates less from the normalized torque command 711 than curve 713.

Graph 720 depicts fueling of the non-dedicated cylinder(s) of a dedicated EGR engine. Curve 721 shows normalized total fueling with compensation. Curve 722 shows normalized total fueling without compensation. It can be observed that lambda without compensation (733) is substantially higher than with compensation (732) which increases the possibility oxidation of catalyst causing NOx emissions. Graph 730 depicts a non-dedicated cylinder lambda reference value curve 731, a non-dedicated cylinder lambda value with compensation curve 732 and a non-dedicated cylinder lambda value without compensation curve 733.

The controls illustrated and described in connection with FIGS. 3-8 are illustrative examples of certain combustion control parameters providing or utilizing compensation for variation of inert matter, unburned air and unburned fuel in EGR output by the dedicated EGR cylinder during transient operation of the engine and compensating for a transport delay and mixing effect of the EGR loop on inert matter, unburned air and unburned fuel provided to the plurality of cylinders which may be determined in accordance with the present disclosure. A number of additional control parameters pertaining to control ignition timing, air flow or fraction and EGR flow or fraction among other control parameters may also be determined and utilized in addition to or in lieu of those described in connection with FIGS. 3-8. It shall be appreciated that unless indicated otherwise the various combustion control parameters disclosed herein may be determined and utilized in controlling combustion system components either individually or in combination with one or more of the other combination control parameters disclosed herein.

Figure 9:
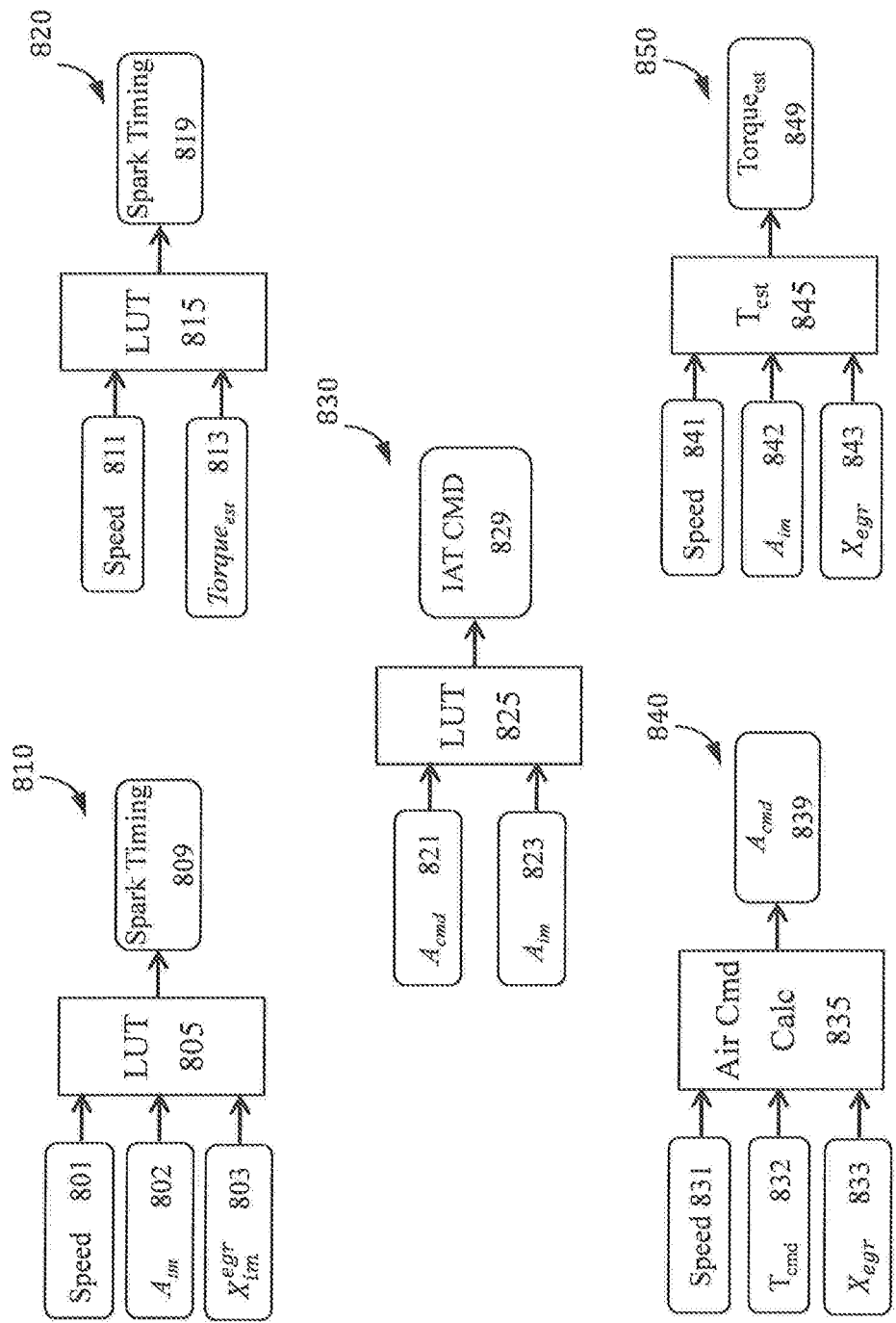
FIG. 9 is a schematic illustration of certain aspects of exemplary controls for dedicated EGR engines.

Further exemplary combustion control parameters are illustrated in FIG. 9. Controls 810 and 820 pertain to ignition spark timing determination the accuracy of which depends on the accuracy of estimates of charge air and EGR. Controls 810 include a lookup table 805 which receives engine speed value at input 801, intake manifold air value ($A_{im}$) at input 802 and EGR fraction value ($X_{im}^{egr}$) at input 803. It shall be appreciated that in further embodiments explicit calculations, formulae, lookup tables and other techniques as would occur to one of skill in the art with the benefit of the present disclosure may be utilized in lieu of or in combination with lookup table 805. From these received inputs, lookup table 805 determines and outputs a plurality of ignition spark timing commands 809 which can be utilized to control the firing of the spark plugs of the ignition system of a dedicated EGR engine. The values of inputs 802 and 803 may be determined using the techniques disclosed herein such that they account and compensate for variation of inert matter, unburned air and unburned fuel in EGR output by the dedicated EGR cylinder during transient operation of the engine and compensating for a transport delay and mixing effect of the EGR loop on inert matter, unburned air and unburned fuel provided to the plurality of cylinders. Accordingly, ignition spark timing is provided which accounts and compensates for such variation. It shall be further appreciated that Controls 810 may be provided in combination with a closed loop knock control utilizing feedback from a knock sensor.

Controls 820 include a lookup table 815 which receives engine speed value at input 811, and estimated engine output torque value (Torque$_{est}$) at input 813. From these received inputs, lookup table 815 determines and outputs a plurality of ignition spark timing commands 819 which can be utilized to control the firing of the spark plugs of the ignition system of a dedicated EGR engine. The values of inputs 811 and 813 may be determined using the techniques disclosed herein such that they account and compensate for variation of inert matter, unburned air and unburned fuel in EGR output by the dedicated EGR cylinder during transient operation of the engine and compensating for a transport delay and mixing effect of the EGR loop on inert matter, unburned air and unburned fuel provided to the plurality of cylinders. Accordingly, ignition spark timing is provided which accounts and compensates for such variation.

It shall be appreciated that control 810 and 820 may be implemented in an electronic control system structured to determine a spark timing value for at least one of the non-dedicated cylinder using input from a first controller and a second spark timing value for the dedicated EGR cylinder using input from a second controller, the first controller and the second controller being responsive to variation of inert matter, unburned air and unburned fuel in EGR output by the dedicated EGR cylinder and being responsive to an effect of the EGR loop on inert matter, unburned air and unburned fuel input to the plurality of cylinders. The electronic control system may be further structured to control the ignition system to provide spark ignition timing for the non-dedicated cylinder according to the first spark ignition value and to provide spark ignition timing for the dedicated EGR cylinder according to the second spark ignition value.

Controls 830 pertain to determination of an air handling control, in particular an intake air throttle (IAT) control. Controls 830 include a lookup table 825 which receives a commanded charge air value ($A_{cmd}$) at input 821 and an intake manifold air value ($A_{im}$) at input 823. From these received inputs, lookup table 825 determines and outputs an intake throttle position command 819 which can be utilized to control the position of an intake throttle of a dedicated EGR engine. The values of inputs 821 and 823 may be determined using the techniques disclosed herein such that they account and compensate for variation of inert matter, unburned air and unburned fuel in EGR output by the dedicated EGR cylinder during transient operation of the engine and compensating for a transport delay and mixing effect of the EGR loop on inert matter, unburned air and unburned fuel provided to the plurality of cylinders. Accordingly, intake throttle control is provided which accounts and compensates for such variation. With the benefit of this disclosure, one of skill in the art shall appreciated that other types of air handling commands, such as variable geometry turbine (VGT) actuator position commands, and wastegate position commands may be determined and used to control operation of a dedicated EGR engine including a turbocharger equipped with a VGT and/or wastegate. Similarly, EGR valve commands may be determined and used to control EGR valve position in dedicated EGR engines including an EGR valve. It shall be further appreciated that controls 830 may be provided in combination with a feedback controller for controlling the intake air throttle (IAT) position.

Controls 840 pertain to determination of a commanded charge air value ($A_{cmd}$). Controls 840 include an air command calculation block 835 which receives engine speed at input 831, a torque command value ($T_{cmd}$) at input 832 and EGR fraction value ($X_{egr}$) at input 833. From these received inputs, clock 335 calculates a charge air command ($A_{cmd}$) which can be utilized to control various components of an air handling system such as turbocharger boost pressure, throttle position etc. The values of inputs 832 and 833 may be determined using the techniques disclosed herein such that they account and compensate for variation of inert matter, unburned air and unburned fuel in EGR output by the dedicated EGR cylinder during transient operation of the engine and compensating for a transport delay and mixing effect of the EGR loop on inert matter, unburned air and unburned fuel provided to the plurality of cylinders. Accordingly, an air command output is provided which accounts and compensates for such variation.

Controls 850 pertain to determination of an estimated engine torque (Torque$_{est}$). Controls 850 include torque estimation block 845 which receives engine speed at input 831, an intake manifold air value ($A_{im}$) at input 832 and EGR fraction value ($X_{egr}$) at input 833. From these received inputs, torque estimation block 845 calculates an estimated engine torque (Torque$_{est}$) which can be utilized in a control loop along with a commanded engine torque to control fueling and air handling in a dedicated EGR engine. The values of inputs 842 and 843 may be determined using the techniques disclosed herein such that they account and compensate for variation of inert matter, unburned air and unburned fuel in EGR output by the dedicated EGR cylinder during transient operation of the engine and compensating for a transport delay and mixing effect of the EGR loop on inert matter, unburned air and unburned fuel provided to the plurality of cylinders. Accordingly, an engine torque estimation output is provided which accounts and compensates for such variation.

Certain aspects of a number of non-limiting embodiments shall now be further described. A first exemplary embodiment is a system comprising: an internal combustion engine including a plurality of cylinders, the plurality of cylinders including at least one dedicated EGR cylinder configured to provide EGR to the engine via an EGR loop and at least one non-dedicated cylinder; a plurality of injectors structured to inject fuel into respective ones of the plurality of cylinders; and an electronic control system operatively coupled with the plurality of injectors and including an electronic control system structured to determine a first fueling value for the non-dedicated cylinder using a first controller and a second fueling value for the dedicated EGR cylinder using a second controller, the first controller and the second controller being responsive to variation of inert matter, unburned air and unburned fuel in EGR output by the dedicated EGR cylinder and being responsive to an effect of the EGR loop on inert matter, unburned air and unburned fuel input to the plurality of cylinders, and control the plurality of injectors to inject fuel into the non-dedicated cylinder according to the first fueling value and to inject fuel into the dedicated EGR cylinder according to the second fueling value.

In certain forms of the first exemplary embodiment the electronic control system utilizes feedback from a single sensor configured to sense an AFR characteristic of exhaust of the non-dedicated cylinder to determine the first fueling value and the second fueling value. In certain forms the first controller is configured to correct for one or both of a mixing effect factor and a transport delay factors attributable one or both of the EGR loop and the intake flowpath. In certain forms the first controller and the second controller are structured to reduce error attributable to variation in unburned fuel provided by the EGR loop during transient operation. In certain forms the first controller is a feedforward controller. In certain forms the electronic control system utilizes feedback from a first sensor structured to sense a first AFR characteristic of exhaust of the non-dedicated cylinder to determine the first fueling value, and utilizes feedback from a second sensor structured to sense a second AFR characteristic of exhaust of the dedicated EGR cylinder to determine utilizes the second fueling value. In certain forms the second controller is a feedback controller. In certain forms the engine is a four-cylinder engine. In certain forms one cylinder of the four-cylinder engine is a dedicated EGR cylinder. In certain forms the engine is a spark ignition engine.

A second exemplary embodiments is a method comprising: operating an engine system, the engine system including at least one dedicated EGR cylinder configured to provide EGR to the engine and at least one non-dedicated cylinder, at least one dedicated EGR cylinder injector structured to provide fuel to the at least one dedicated EGR cylinder, at least one non-dedicated cylinder injector structured to provide fuel to the at least one non-dedicated EGR cylinder, and an electronic control system in operative communication with the plurality of injectors; determining with the electronic control system a first fueling value for the non-dedicated cylinder and a second fueling value for the dedicated EGR cylinder using, said determining accounting for variation of inert matter, unburned air and unburned fuel in EGR output by the dedicated EGR cylinder; and operating the electronic control system to control the plurality of injectors to inject fuel into the non-dedicated cylinder according to the first fueling value and to inject fuel into the dedicated EGR cylinder according to the second fueling value.

In certain forms of the second exemplary embodiment the act of determining accounts for one or both of delay and mixing of inert mass, unburned air mass and unburned fuel input to the plurality of cylinders attributable at least in part to an EGR loop of the engine system. In certain forms a single AFR feedback indicating an AFR characteristic of exhaust of the only the non-dedicated cylinder is utilized in determining the first fueling value and the second fueling value. In certain forms the first fueling value and the second fueling value correct for one or both of a transport delay effect and a mixing effect attributable one or both of the EGR loop and the intake flowpath. In certain forms the first fueling value is determined using a first controller and the second fueling value is determined using a second controller. In certain forms the first controller is a feedforward controller. In certain forms the second controller is a feedback controller. In certain forms feedback indicating a first AFR characteristic of exhaust output by the non-dedicated cylinder is utilized to determine the first fueling value, and feedback indicating a second AFR characteristic of exhaust output by the dedicated EGR cylinder is utilized to determine utilizes the second fueling value.

A third exemplary embodiment is an apparatus comprising: an electronic control system including a processor and a non-transitory computer-readable memory medium, the electronic control system configured to execute instructions stored in the non-transitory computer-readable memory medium to output control signals effective to control operation of a plurality of injectors to inject fuel into at least one dedicated EGR cylinder of an engine and at least one non-dedicated cylinder of the engine, said instructions being executable by the processor to: determine a first fueling value for the non-dedicated cylinder and a second fueling value for the dedicated EGR cylinder using, the first fueling value and the second fueling value accounting for one or both of delay and mixing of inert mass, unburned air mass and unburned fuel input to the plurality of cylinders introduced by at least one of an EGR loop and an air intake system of the engine, determine and output a first control signal effective to control injection of fuel into the non-dedicated cylinder in response to the first fueling value and a second control signal effective to control injection of fuel into the dedicated EGR cylinder in response to the second fueling value.

In certain forms of the third exemplary embodiment the first fueling value and the second fueling value account for variation of inert matter, unburned air and unburned fuel in EGR output by the dedicated EGR cylinder. In certain forms feedback indicating an AFR characteristic of exhaust of only the non-dedicated cylinder is utilized in determining the first fueling value and the second fueling value. In certain forms the first fueling value is determined using a first controller and the second fueling value is determined using a second controller. In certain forms the first controller is a feedforward controller. In certain forms the second controller is a feedback controller. In certain forms first feedback indicating a first AFR characteristic of exhaust output by the non-dedicated cylinder is utilized to determine the first fueling value, and second feedback indicating a second AFR characteristic of exhaust output by the dedicated EGR cylinder is utilized to determine utilizes the second fueling value. Certain forms further comprise the engine. Certain forms further comprise the plurality of injectors.

A fourth exemplary embodiment is a system comprising an internal combustion engine including a plurality of cylinders, the plurality of cylinders including at least one dedicated EGR cylinder configured to provide EGR to the engine via an EGR loop and at least one non-dedicated cylinder; a fueling system including a plurality of injectors structured to inject fuel into respective ones of the plurality of cylinders; an ignition system including a plurality of spark plugs structured to ignite charge mixture in respective ones of the plurality of cylinders; a throttle structured to control gas flow, i.e., charge mixture flow, to the plurality of cylinders; and an electronic control system operatively coupled with the fueling system, the ignition system and the throttle, the electronic control system being configured to control combustion during transient operation of the engine by: determining one or more combustion control parameters compensating for one or both of (a) variation of one or more of inert matter, unburned air and unburned fuel in EGR output by the dedicated EGR cylinder during transient operation of the engine and (b) one or both of a transport delay and a mixing effect of the EGR loop on one or more of inert matter, unburned air and unburned fuel provided to the plurality of cylinders, and controlling operation of at least one of the throttle, the ignition system and the plurality of injectors in response to at least one of the one or more combustion control parameters.

In certain forms the fourth exemplary embodiment the electronic control system is structured to control combustion during transient operation of the engine by: determining a first fueling value for the non-dedicated cylinder using a first controller and a second fueling value for the dedicated EGR cylinder using a second controller, the first controller and the second controller being responsive to variation of inert matter, unburned air and unburned fuel in EGR output by the dedicated EGR cylinder and being responsive to an effect of the EGR loop on inert matter, unburned air and unburned fuel input to the plurality of cylinders, and controlling the plurality of injectors to inject fuel into the non-dedicated cylinder according to the first fueling value and to inject fuel into the dedicated EGR cylinder according to the second fueling value. In certain forms the electronic control system utilizes feedback from a single sensor configured to sense an AFR characteristic of exhaust of the non-dedicated cylinder to determine the first fueling value and the second fueling value. In certain forms the first controller is configured to correct for one or more transport delay factors attributable one or both of the EGR loop and the intake flowpath. In certain forms the first controller and the second controller are structured to reduce error attributable to variation in unburned fuel provided by the EGR loop during transient operation. In certain forms the first controller is a feedforward controller. In certain forms the electronic control system utilizes feedback from a first sensor structured to sense a first AFR characteristic of exhaust of the non-dedicated cylinder to determine the first fueling value, and utilizes feedback from a second sensor structured to sense a second AFR characteristic of exhaust of the dedicated EGR cylinder to determine utilizes the second fueling value. In certain forms the second controller is a feedback controller. In certain forms the engine is one of a four-cylinder engine with a single dedicated EGR cylinder and a six-cylinder engine with two dedicated EGR cylinders. In certain forms the electronic control system is structured to control combustion during transient operation of the engine by: determining a first spark timing value for at least one of the non-dedicated cylinder in response to output of a first controller and a second spark timing value for the dedicated EGR cylinder in response to output of a second controller, the first controller and the second controller being responsive to variation of inert matter, unburned air and unburned fuel in EGR output by the dedicated EGR cylinder and being responsive to an effect of the EGR loop on inert matter, unburned air and unburned fuel input to the plurality of cylinders, and controlling the ignition system to provide spark ignition timing for the non-dedicated cylinder according to the first spark ignition value and to provide spark ignition timing for the dedicated EGR cylinder according to the second spark ignition value. In certain forms the first spark timing value and the second spark timing value are determined by a lookup table which receives inputs comprising an engine speed value, an intake manifold air value and an intake manifold EGR fraction value. In certain forms the first spark timing value and the second spark timing value are determined by a lookup table which receives inputs comprising an engine speed value and an estimated engine torque value. In certain forms the electronic control system is structured to control combustion during transient operation of the engine by: determining an intake air value for the dedicated EGR cylinder and the non-dedicated cylinder using a controller responsive to variation of unburned air in EGR output by the dedicated EGR cylinder and responsive to an effect of the EGR loop on unburned air input to the plurality of cylinders, determining an air handling command in response to the determined air intake value, and controlling an intake air handling actuator in response to the determined air handling command. In certain forms the intake air handling actuator is an intake air throttle and the air handling command is an intake air throttle position. In certain forms the electronic control system is structured to control combustion during transient operation of the engine by: providing a torque command value, an engine speed value and an EGR fraction value to an air command calculation block, calculating an intake air command value in response to the torque command, the engine speed value and the EGR fraction value, and controlling an air handling actuator in response to the intake air command. In certain forms the electronic control system is structured to control combustion during transient operation of the engine by: providing an intake manifold air value, an engine speed value and an EGR fraction value to a torque reference calculation block, calculating an estimated torque in response to the intake manifold, the engine speed value and the EGR fraction value, and controlling torque output of the dedicated EGR engine in response to the estimated torque.

A fifth exemplary embodiment is a method comprising: operating an internal combustion engine including a plurality of cylinders, the plurality of cylinders including at least one dedicated EGR cylinder configured to provide EGR to the engine via an EGR loop and at least one non-dedicated cylinder, a fueling system including a plurality of injectors structured to inject fuel into respective ones of the plurality of cylinders, an ignition system including a plurality of spark plugs structured to ignite charge mixture in respective ones of the plurality of cylinders, a throttle structured to control air flow to the plurality of cylinders, and an electronic control system operatively coupled with the fueling system, the ignition system and the throttle; determining, with the electronic control system, one or more combustion control parameters compensating for one or both of (a) variation of at least one of inert matter, unburned air and unburned fuel in EGR output by the dedicated EGR cylinder during transient operation of the engine and (b) at least one of a transport delay and a mixing effect of the EGR loop on at least one of inert matter, unburned air and unburned fuel provided to the plurality of cylinders; and controlling, with the electronic control system, operation of at least one of the throttle, the ignition system and the plurality of injectors in response to at least one of the one or more combustion control parameters.

In certain forms the fifth exemplary embodiment the acts of determining and controlling comprise: determining a first fueling value for the non-dedicated cylinder using a first controller and a second fueling value for the dedicated EGR cylinder using a second controller, the first controller and the second controller being responsive to variation of inert matter, unburned air and unburned fuel in EGR output by the dedicated EGR cylinder and being responsive to an effect of the EGR loop on inert matter, unburned air and unburned fuel input to the plurality of cylinders, and controlling the plurality of injectors to inject fuel into the non-dedicated cylinder according to the first fueling value and to inject fuel into the dedicated EGR cylinder according to the second fueling value. In certain forms the electronic control system utilizes feedback from a single sensor configured to sense an AFR characteristic of exhaust of the non-dedicated cylinder to determine the first fueling value and the second fueling value. In certain forms the first controller is configured to correct for one or more transport delay factors attributable one or both of the EGR loop and the intake flowpath. In certain forms the first controller and the second controller are structured to reduce error attributable to variation in unburned fuel provided by the EGR loop during transient operation. In certain forms the first controller is a feedforward controller. In certain forms the electronic control system utilizes feedback from a first sensor structured to sense a first AFR characteristic of exhaust of the non-dedicated cylinder to determine the first fueling value, and utilizes feedback from a second sensor structured to sense a second AFR characteristic of exhaust of the dedicated EGR cylinder to determine utilizes the second fueling value. In certain forms the second controller is a feedback controller. In certain forms the engine is one of a four-cylinder engine with a single dedicated EGR cylinder and a six-cylinder engine with two dedicated EGR cylinders. In certain forms the electronic control system is structured to control combustion during transient operation of the engine by: determining a first spark timing value for at least one of the non-dedicated cylinder using a first controller and a second spark timing value for the dedicated EGR cylinder using a second controller, the first controller and the second controller being responsive to variation of inert matter, unburned air and unburned fuel in EGR output by the dedicated EGR cylinder and being responsive to an effect of the EGR loop on inert matter, unburned air and unburned fuel input to the plurality of cylinders, and controlling the ignition system to provide spark ignition timing for the non-dedicated cylinder according to the first spark ignition value and to provide spark ignition timing for the dedicated EGR cylinder according to the second spark ignition value. In certain forms the first spark timing value and the second spark timing value are determined by a lookup table which receives inputs comprising an engine speed, and an estimated engine torque. In certain forms the first spark timing value and the second spark timing value are determined by a lookup table which receives inputs comprising an engine speed, an intake manifold air value and an intake manifold EGR fraction. In certain forms the acts of determining and controlling comprise: determining an intake air value for the dedicated EGR cylinder and the non-dedicated cylinder using a controller responsive to variation of unburned air in EGR output by the dedicated EGR cylinder and responsive to an effect of the EGR loop on unburned air input to the plurality of cylinders, determining an air handling command in response to the determined air intake value, and controlling an intake air handling actuator in response to the determined air handling command. In certain forms the intake air handling actuator is an intake air throttle and the air handling command is an intake air throttle position. In certain forms the acts of determining and controlling comprise: providing a torque command, an engine speed value and an EGR fraction value to an air command calculation block, calculating an intake air command value in response to the torque command, the engine speed value and the EGR fraction value, and controlling an air handling actuator in response to the intake air command. In certain forms the acts of determining and controlling comprise: providing an intake manifold air value, an engine speed value and an EGR fraction value to a torque reference calculation block, calculating an estimated torque in response to the intake manifold, the engine speed value and the EGR fraction value, and controlling torque output of the dedicated EGR engine in response to the estimated torque.

A sixth exemplary embodiment is an apparatus comprising a non-transitory controller-readable medium configured with instructions executable by a controller to perform the method of any of the foregoing methods and their various forms.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
    an internal combustion engine including a plurality of cylinders, the plurality of cylinders including at least one dedicated EGR cylinder configured to provide EGR to the engine via an EGR loop and at least one non-dedicated cylinder;
    a fueling system including a plurality of injectors structured to inject fuel into respective ones of the plurality of cylinders;
    an ignition system including a plurality of spark plugs structured to ignite charge mixture in respective ones of the plurality of cylinders;
    a throttle structured to control gas flow to the plurality of cylinders; and
    an electronic control system operatively coupled with the fueling system, the ignition system and the throttle, the electronic control system being configured to control combustion during transient operation of the engine by:
    determining one or more combustion control parameters compensating for variation of one or more exhaust constituents of EGR output by the dedicated EGR cylinder during transient operation of the engine, and
    controlling combustion of the internal combustion engine-in response to at least one of the one or more combustion control parameters.

2. The system of claim 1 wherein the electronic control system is structured to control combustion during transient operation of the engine by:
    determining a first fueling value for the non-dedicated cylinder using a first controller and a second fueling value for the dedicated EGR cylinder using a second controller, the first controller and the second controller being responsive to variation of the one or more exhaust constituents of EGR output by the dedicated EGR cylinder and being responsive to an effect of the EGR loop on the one or more exhaust, and controlling the plurality of injectors to inject fuel into the non-dedicated cylinder according to the first fueling value and to inject fuel into the dedicated EGR cylinder according to the second fueling value.

3. The system of claim 2 wherein the electronic control system utilizes feedback from a single sensor configured to sense an AFR characteristic of exhaust of the non-dedicated cylinder to determine the first fueling value and the second fueling value.

4. The system of claim 2 wherein the first controller and the second controller are structured to reduce error attributable to variation in unburned fuel provided by the EGR loop during transient operation.

5. The system of claim 2 wherein one or both of (a) the first controller is a feedforward controller and (b) the second controller is a feedback controller.

6. The system of claim 2 wherein the electronic control system utilizes feedback from a first sensor structured to sense a first AFR characteristic of exhaust of the non-dedicated cylinder to determine the first fueling value, and utilizes feedback from a second sensor structured to sense a second AFR characteristic of exhaust of the dedicated EGR cylinder to determine utilizes the second fueling value.

7. The system of claim 2 wherein the engine is one of a four-cylinder engine with a single dedicated EGR cylinder and a six-cylinder engine with two dedicated EGR cylinders.

8. The system of claim 1 wherein the electronic control system is structured to control combustion during transient operation of the engine by:
determining a first spark timing value for at least one of the non-dedicated cylinder in response to output of a first controller and a second spark timing value for the dedicated EGR cylinder in response to output of a second controller, the first controller and the second controller being responsive to variation of the one or more exhaust constituents EGR output by the dedicated EGR cylinder and being responsive to an effect of the EGR loop on the one or more exhaust constituents of input to the plurality of cylinders, and
controlling the ignition system to provide spark ignition timing for the non-dedicated cylinder according to the first spark ignition value and to provide spark ignition timing for the dedicated EGR cylinder according to the second spark ignition value.

9. The system of claim 8 wherein one or both of: (a) the first spark timing value and the second spark timing value are determined by a lookup table which receives inputs comprising an engine speed value, an intake manifold air value and an intake manifold EGR fraction value, and (b) the first spark timing value and the second spark timing value are determined by a lookup table which receives inputs comprising an engine speed value and an estimated engine torque value.

10. The system of claim 1 wherein the electronic control system is structured to control combustion during transient operation of the engine by:
determining an intake air value for the dedicated EGR cylinder and the non-dedicated cylinder using a controller responsive to variation of unburned air in EGR output by the dedicated EGR cylinder and responsive to an effect of the EGR loop on unburned air input to the plurality of cylinders, determining an air handling command in response to the determined air intake value, and controlling an intake air handling actuator in response to the determined air handling command.

11. The system of claim 10 wherein the intake air handling actuator is an intake air throttle and the air handling command is an intake air throttle position.

12. The system of claim 1 wherein the electronic control system is structured to control combustion during transient operation of the engine by:
providing a torque command value, an engine speed value and an EGR fraction value to an air command calculation block, calculating an intake air command value in response to the torque command, the engine speed value and the EGR fraction value, and controlling an air handling actuator in response to the intake air command.

13. The system of claim 1 wherein the electronic control system is structured to control combustion during transient operation of the engine by:
providing an intake manifold air value, an engine speed value and an EGR fraction value to a torque reference calculation block, calculating an estimated torque in response to the intake manifold, the engine speed value and the EGR fraction value, and controlling torque output of the dedicated EGR engine in response to the estimated torque.

14. A method comprising:
operating an internal combustion engine including a plurality of cylinders, the plurality of cylinders including at least one dedicated EGR cylinder configured to provide EGR to the engine via an EGR loop and at least one non-dedicated cylinder, a fueling system including a plurality of injectors structured to inject fuel into respective ones of the plurality of cylinders, an ignition system including a plurality of spark plugs structured to ignite charge mixture in respective ones of the plurality of cylinders, a throttle structured to control air flow to the plurality of cylinders, and an electronic control system operatively coupled with the fueling system, the ignition system and the throttle;

determining, with the electronic control system, one or more combustion control parameters compensating for variation of at least one of the one or more exhaust constituents of EGR output by the dedicated EGR cylinder during transient operation of the engine; and controlling, with the electronic control system, combustion of the internal combustion engine in response to at least one of the one or more combustion control parameters.

15. The method of claim 14 wherein the acts of determining and controlling comprise:
determining a first fueling value for the non-dedicated cylinder using a first controller and a second fueling value for the dedicated EGR cylinder using a second controller, the first controller and the second controller being responsive to variation of the one or more exhaust constituents of EGR output by the dedicated EGR cylinder and being responsive to an effect of the EGR loop on the one or more exhaust constituents input to the plurality of cylinders, and controlling the plurality of injectors to inject fuel into the non-dedicated cylinder according to the first fueling value and to inject fuel into the dedicated EGR cylinder according to the second fueling value.

16. The method of claim 15 wherein the electronic control system utilizes feedback from a single sensor configured to sense an AFR characteristic of exhaust of the non-dedicated cylinder to determine the first fueling value and the second fueling value.

17. The method of claim 15 wherein the first controller and the second controller are structured to reduce error attributable to variation in unburned fuel provided by the EGR loop during transient operation.

18. The method of claim 15 wherein the electronic control system utilizes feedback from a first sensor structured to sense a first AFR characteristic of exhaust of the non-dedicated cylinder to determine the first fueling value, and utilizes feedback from a second sensor structured to sense a second AFR characteristic of exhaust of the dedicated EGR cylinder to determine utilizes the second fueling value.

19. The method of claim 14 wherein the electronic control system is structured to control combustion during transient operation of the engine by:
   determining a first spark timing value for at least one of the non-dedicated cylinder using a first controller and a second spark timing value for the dedicated EGR cylinder using a second controller, the first controller and the second controller being responsive to variation of the one or more exhaust constituents output by the dedicated EGR cylinder and being responsive to an effect of the EGR loop on the one or more exhaust constituents input to the plurality of cylinders, and
   controlling the ignition system to provide spark ignition timing for the non-dedicated cylinder according to the first spark ignition value and to provide spark ignition timing for the dedicated EGR cylinder according to the second spark ignition value.

20. The method of claim 19 wherein one or both of (a) the first spark timing value and the second spark timing value are determined by a lookup table which receives inputs comprising an engine speed, and an estimated engine torque, and (b) the first spark timing value and the second spark timing value are determined by a lookup table which receives inputs comprising an engine speed, an intake manifold air value and an intake manifold EGR fraction.

21. The method of claim 14 wherein the acts of determining and controlling comprise:

determining an intake air value for the dedicated EGR cylinder and the non-dedicated cylinder using a controller responsive to variation of unburned air in EGR output by the dedicated EGR cylinder and responsive to an effect of the EGR loop on unburned air input to the plurality of cylinders,
determining an air handling command in response to the determined air intake value, and
controlling an intake air handling actuator in response to the determined air handling command.

22. The method of claim 14 wherein the acts of determining and controlling comprise:
providing a torque command, an engine speed value and an EGR fraction value to an air command calculation block,
calculating an intake air command value in response to the torque command, the engine speed value and the EGR fraction value, and
controlling an air handling actuator in response to the intake air command.

23. The method of claim 14 wherein the acts of determining and controlling comprise:
providing an intake manifold air value, an engine speed value and an EGR fraction value to a torque reference calculation block,
calculating an estimated torque in response to the intake manifold, the engine speed value and the EGR fraction value, and
controlling torque output of the dedicated EGR engine in response to the estimated torque.

24. The system of claim 1, wherein the one or more exhaust constituents comprises unburned fuel.

25. The system of claim 1, wherein said controlling combustion of the internal combustion engine in response to at least one of the one or more combustion control parameter comprises controlling operation of at least the plurality of injectors.

26. The method of claim 13, wherein the one or more exhaust constituents comprises unburned fuel.

27. The method of claim 13, wherein said controlling, with the electronic control system, combustion of the internal combustion engine in response to at least one of the one or more combustion control parameter comprises controlling operation of at least the plurality of injectors.

* * * * *